Aug. 24, 1937.  L. V. KAYE  2,091,099

SPRING PRESS STUD FASTENER

Filed Dec. 18, 1935

Inventor:
Leslie Vincent Kaye
By Emil Bonnelycke
Attorney

Patented Aug. 24, 1937

2,091,099

UNITED STATES PATENT OFFICE 2,091,099

SPRING PRESS STUD FASTENER

Leslie Vincent Kaye, Wellington, New Zealand

Application December 18, 1935, Serial No. 55,121

3 Claims. (Cl. 24—224)

This invention relates to the well known forms of fasteners for garments in which each fastener is constituted by two button like members adapted to be secured respectively to the two parts or portions to be secured together and then to be fastened together in engagement one with the other by the insertion of a projecting stud on one member into an aperture in the other member, to be then gripped by spring grips contained in this latter member. These types of fasteners are sometimes referred to under the general name of spring dome fasteners, but as made in accordance with this invention, are more appropriately termed spring press stud fasteners.

The invention has been devised with the principal object of providing a construction of the spring gripping member (which for the purposes of explanation will be hereinafter referred to as the female member) which will allow for the insertion and gripping of the stud of the other member in the ordinary manner, but in addition, will provide for this stud being securely locked within the female member when any strain is placed on the fastening such as could in ordinary circumstances tend to draw the two members apart. Thus the liability of the fastening to give way when subjected to a strain inherent in the usual form of spring dome or stud fasteners will be obviated in this construction.

The invention also comprises other features which will be hereinafter more definitely referred to when describing the detail features of the invention.

This will be done with reference to the accompanying drawing, in which:—

Figure 1:
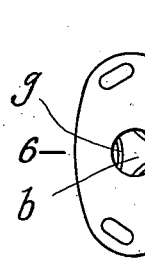
Figure 1 is a plan of the female member.
Figure 2:
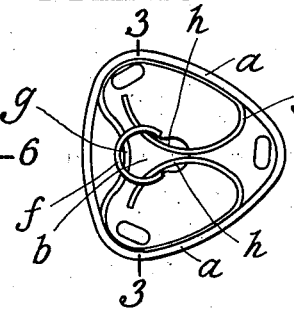
Figure 2 is an underneath plan thereof.
Figure 3:
Figure 3 is a cross sectional elevation on the line 3—3 of Figure 2.
Figure 4:
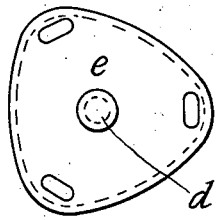
Figure 4 is a plan.
Figure 5:
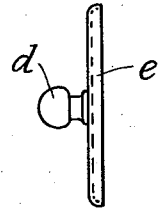
Figure 5 is a side elevation of the stud member.
Figure 6:
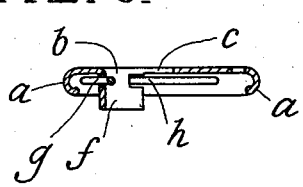
Figure 6 is a sectional elevation of the female member taken on the line 6—6 of Figure 1.

All of the figures of the drawing are drawn to an exaggerated scale in order to show clearly the features of construction. In actual fact the fasteners may be made in all the sizes generally employed in respect of these classes of fasteners.

In this invention the female member of the fastener is made of the usual plate metal form and of the desired shape and to provide the downwardly curved rim edge $a$ in the well known manner. Its stud receiving opening $b$ however, is formed with a narrowed slot extension $c$ opening therefrom for a short distance. This slot extension is made of a width that is less than the diameter of the head of the stud $d$ of the stud member $e$, but slightly greater than the diameter of the stud stem portion in order that the stud head when it has been passed in through the opening $b$ may, by sliding into the extension, engage behind the edges thereof to hold the stud within this extension in a manner that is already known in the art.

The invention, though, provides that the stud shall be so controlled within the female member as to maintain it normally within the opening $b$ proper, in order that it may function in the manner common to these fasteners when in use and particularly in drawing the two members apart, but so that when a lateral strain is placed on the joint, will slide into the extension, to thus lock the stud from withdrawal while the strain remains. When the strain is eased, the stud returns to its normal position.

For this purpose the female member has combined with it a novel form of the spring used for engaging behind the stud head characteristic of these fasteners, and such spring co-operates with the opening $b$ and the extension $c$ to act in a manner under which it will allow of the insertion and withdrawal of the head from the opening under the usual force employed, and will when the head is inserted, engage behind it by closing in on the stem, and will also control the entry of the stud stem into the extension, by sliding, in such a manner as to normally restrain it from entry. This restraint is of a nature that will give way when a force is exerted to slide the stem into the extension, but which will act to expel it therefrom when this force is removed.

For this purpose the opening $b$ is surrounded on the inside, by a flange $f$ which however is not carried round the edge of the extension $c$. The flange is pierced with slot openings suitably placed. A length of spring wire $j$ is employed to be held within the back of the member by engaging within the rim edge $a$ in the well known manner. This spring is so shaped that its middle is curved as at $g$, a distance into the space enclosed by the flange $f$, at a point opposite the entry to the extension $c$. The two ends of the spring are then carried out round the respective sides of the member and are doubled round and curved in, as at $h$, from opposite sides to come close together from opposite sides of the extension and then to curve respectively outward across the area of the opening $b$ and through slots formed in the flange $f$, which thus serve to keep the spring in position for its engagement with the stud of the stud member.

Figure 7:
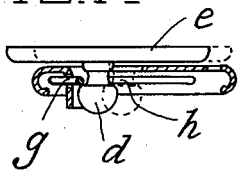
Figure 7 is a similar section of the female member showing the stud member, in elevation, in its normal locked position therein.

It will thus be seen that the spring ends as they come together beneath the space enclosed by the extension $c$ and then curve apart beneath the opening, serve to act in conjunction with the part $g$ to engage behind the stud head at three points when the head has been forced into the opening in the usual manner, and will give to release the head when the two fastener members are pulled apart. Also these ends will present a springy resistance against the stud stem passing into the extension, to keep the stem normally in the line of the opening but will open apart to permit of the stem passing into the extension when a lateral strain is placed on the members of the fastening and as indicated by the dotted lines in Figure 7.

Figure 8:
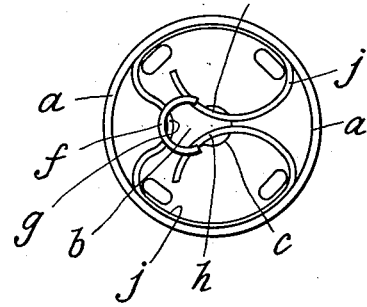
Figure 8 is an underneath plan of an alternative form of female member.
Figure 9:
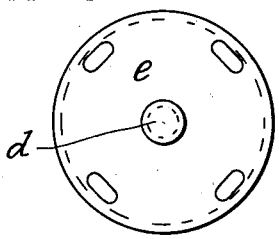
Figure 9 is a plan of the stud member for use therewith.

It is considered preferable that the fastening members should be of equilateral triangular form as shown in Figures 1 to 7 in order that, with the female member, the opening $b$ and its extension $c$ may be disposed along the vertical line from one of the sides, with the extension end occupying the centre of the triangle. This member of the fastener is secured to the article concerned with the extension disposed in the line on which the strain is directed. The stud member has its stud disposed at the centre of the triangle in order that this member may be fastened to the portion of the article with which it is concerned without regard to its positioning on such article. The fastener may, however, be formed of circular form as shown in Figures 8 and 9.

I claim:—

1. A snap fastener comprising a stud member having a stem and an enlarged head, a cooperating plate-like female member having a stud-receiving opening provided therein of a size to receive the enlarged head of the stud and a slot extending laterally from said opening of a width greater than the diameter of the stem of the stud and smaller than the head of the stud, and a loop of resilient wire associated with said female member, the mid-portion of said loop overlying the edge of said opening opposite said slot and the ends of said loop overlying the edges of said slot at the mouth of the slot for engaging the head of the stud to resist withdrawal of the stud from the opening and to resiliently urge the stud from the slot into the opening, but permitting entry of said stud into said slot upon the application of extraneous lateral forces to said stud and female member.

2. A spring-pressed stud fastener combination comprising a stud member, a female member provided with a stud-receiving opening having an extension slot opening therefrom of a width less than the diameter of the head of the stud member but greater than the diameter of the stem of such stud, and a spring on the underside of the female member acting in conjunction with the said stud-receiving opening to engage behind the stud head when it is inserted in said opening, said spring being formed of wire shaped to bend inwardly, across and behind the opening at three points and to extend from opposite sides in across the entry to the slot extension in the path of travel of the stud from the opening into the slot to constantly resiliently resist entry of the stud into the slot and urge the stud, when in the slot, back into the opening to facilitate disassemblage.

3. A spring-pressed stud fastener combination comprising a stud member, a female member provided with a stud-receiving opening having an extension slot opening therefrom of a width less than the diameter of the head of the stud member but greater than the diameter of the stem of such stud, and a spring on the underside of the female member acting in conjunction with the said stud-receiving opening to engage behind the stud head when it is inserted in said opening, said spring having a portion lying in the path of travel of the stud from the opening into the slot to constantly resiliently resist entry of the stud into the slot and urge the stud, when in the slot, back into the opening to facilitate disassemblage, said stud and female members being respectively formed of triangular shape and the female member having its stud-receiving opening and extension slot thereof disposed vertically with the base of the triangle.

LESLIE VINCENT KAYE.